Patented Oct. 23, 1928.

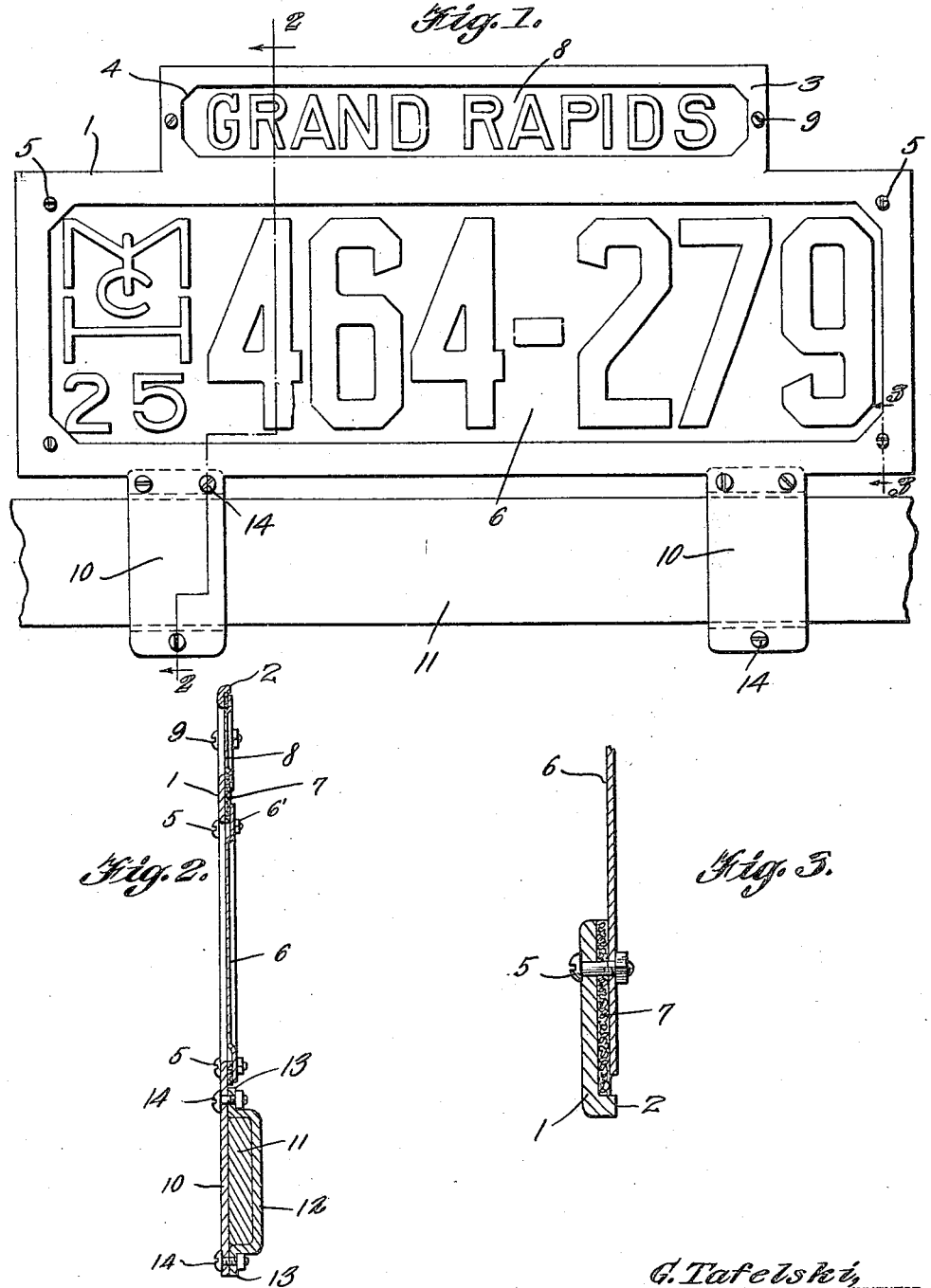

1,689,088

UNITED STATES PATENT OFFICE.

GEORGE TAFELSKI, OF GRAND RAPIDS, MICHIGAN.

LICENSE HOLDER.

Application filed May 18, 1925. Serial No. 31,181.

My present invention has reference to an improved means for supporting a license tag and city name plate on an automobile.

My object is the provision in a means for this purpose of a frame to the rear of which, and exposed through the front thereof, there are arranged the city name and tag plates, compressible means being arranged between the said plates and frame for holding the plates from rattling after they are fixed to the frame, the said frame being integrally formed with depending ears for contacting with the upper bar of the bumper of the automobile, the said ears cooperating with and being removably attached to said plates, whereby the device is firmly supported so that the tags thereon will be fully displayed, and in a manner which will not prevent the free passage of air through the cores of the radiator of the automobile.

A still further object is the provision of a device for this purpose that is characteristic of simplicity in construction, cheapness in manufacture, ease in attachment and thorough efficiency for the purpose devised.

For a comprehensive understanding of the improvement, reference is to be had to the drawings which accompany and form part of this application.

In the drawings:—

Figure 1 is a front elevation of the improvement in attached position.

Figure 2 is a sectional view on the line 2—2 of Figure 1.

Figure 3 is a fragmentary sectional view on the line 3—3 of Figure 1.

As disclosed by the drawings the body of my improvement may be stamped from a single blank of metal. The outer edges and ends of the body are flanged inwardly, as at 2. The improvement includes a substantially rectangular frame proper which is designated by the numeral 1. The frame proper on its upper edge is formed with an extension of substantially rectangular formation. This extension, indicated by the numeral 3, has a longitudinal opening therethrough, and the corners provided by this opening are arranged at an angle, as indicated by the numerals 4. The angle corners of the main frame 1 and the auxiliary frame 3 reinforce both of the said frames, and in addition thereto the widened corners of the main frame are not weakened by bolt openings therethrough. The bolts 5 that pass through these openings also pass through the usual openings at the corners of a license tag plate 6. The bolts 5 are engaged by nuts 6'. Between the frame 1 and the license tag plate 6 there is a substantially rectangular compressible member or washer 7. The washer is preferably of felt and does not project into the open portion of the frame 1. The washer prevents any tendency toward rattling or noise between the license tag and the frame regardless of the uneven surfaces over which the automobile travels. The upper and auxiliary frame 3 has arranged to the rear thereof, a city name plate 8, attached by bolts 9 which are engaged by the usual nuts and between the plate 8 and the auxiliary frame there is a compressible washer similar to the washer 7. As a matter of fact, both of these washers may be integrally formed.

Integrally formed with and projecting from the lower edge of the frame 1, at points equi-distant from the ends of the said frame there are ears 10 of substantially rectangular formation. These ears are disposed for contacting engagement with the outer faces of the upper bars 11 of the bumpers for the automobile. To the rear of the ears 10 there are arranged brackets 12. The brackets are of substantially U-shaped formation and have their parallel ends flanged outwardly in opposite directions, as at 13. The U-shaped brackets are of a size to snugly engage the bar 11 of the bumper and there are passed through the ears 10 and through suitable openings in the flanges 13 of the brackets 12, bolt members 14 which are engaged by nuts 15. The nuts are held from turning by their contacting engagement with the ends of the brackets.

The simplicity of my construction and its advantages will be manifest to those skilled in the art to which such inventions relate, and it is thought that further detailed description will not be required.

What I claim is:—

As a new article of manufacture, a holder for a license plate and a city name plate for automobiles, comprising a member stamped from a sheet of metal to include a main frame for the license plate and an auxiliary frame extending from the upper edge of the main frame for the city name plate, both of said frames having their corner edges inwardly flanged, means for removably securing the plates between the flanges of the frames, a washer lying between the frame and plate, and flat depending ears on the main plate flush with the outer face thereof, and a U-shaped bracket adapted to be connected with said ears and designed for lapping engagement with a support and securing means for holding the U-shaped bracket to the ears.

In testimony whereof, I affix my signature.

GEORGE TAFELSKI.